(12) United States Patent
Palm

(10) Patent No.: US 6,179,538 B1
(45) Date of Patent: Jan. 30, 2001

(54) SCREW FOR FASTENING METAL OR PLASTIC SECTIONS OR PLATES ONTO A BASE

(75) Inventor: Erich Palm, Au (CH)

(73) Assignee: SFS Industries Holding AG, Heerbrugg (CH)

( * ) Notice: Under 35 U.S.C. 154(b), the term of this patent shall be extended for 0 days.

(21) Appl. No.: 09/297,217

(22) PCT Filed: Oct. 9, 1997

(86) PCT No.: PCT/EP97/05570

§ 371 Date: Apr. 23, 1999

§ 102(e) Date: Apr. 23, 1999

(87) PCT Pub. No.: WO98/19071

PCT Pub. Date: May 7, 1998

(30) Foreign Application Priority Data

Oct. 25, 1996 (DE) .............................................. 196 44 507

(51) Int. Cl.[7] ...................................................... F16B 23/00
(52) U.S. Cl. .................................................. 411/399; 411/1
(58) Field of Search ......................................... 411/399, 1

(56) References Cited

FOREIGN PATENT DOCUMENTS

| 7725441 | 12/1977 | (DE) . |
|---|---|---|
| 84 33 318 U | 9/1988 | (DE) . |
| 40 19 157 C1 | 1/1992 | (DE) . |
| 295 02 068 | 6/1996 | (DE) . |
| 2 606 065 | 5/1988 | (FR) . |
| 898026 | 6/1962 | (GB) . |
| 997733 | 8/1963 | (GB) . |
| WO 97 12152 | 4/1997 | (WO) . |

*Primary Examiner*—Suzanne Dino Barrett
(74) *Attorney, Agent, or Firm*—Volpe and Koeing, P.C.

(57) ABSTRACT

In a screw for fastening metal sections (10) to a substructure (11), a shank (2) is provided with a threaded portion (5) and a drive portion (3) for applying a driving device. The portion of the shank (2) adjacent to the drive portion (3) flares conically toward the drive portion (3). The thread (5) engages in the substructure (11), whereby the conical portion (6) is pulled into contact with the section (10) and presses it against the substructure (11). By virtue of appropriate friction, the torque is increased to an appropriate level, and so torque-dependent stopping of the driving action can be achieved.

16 Claims, 3 Drawing Sheets

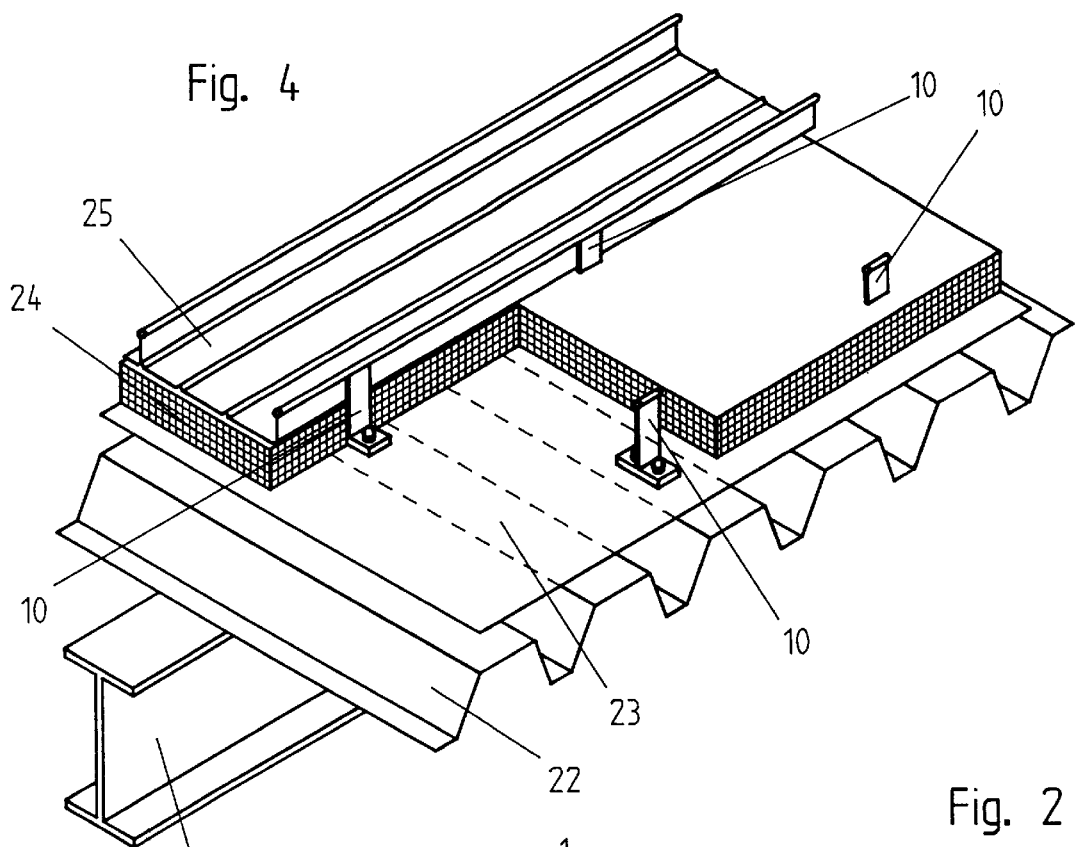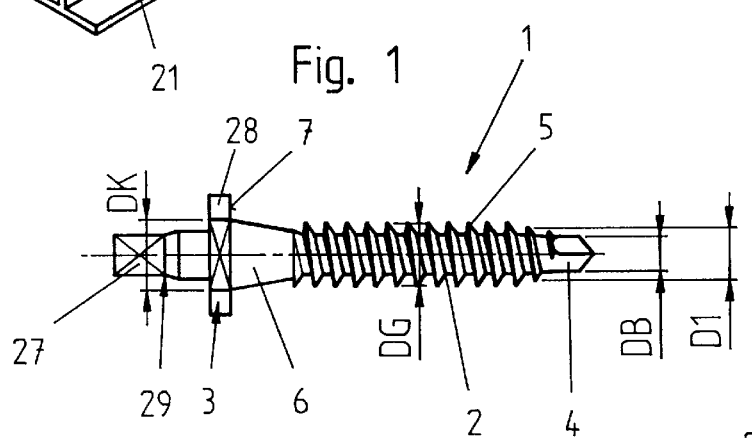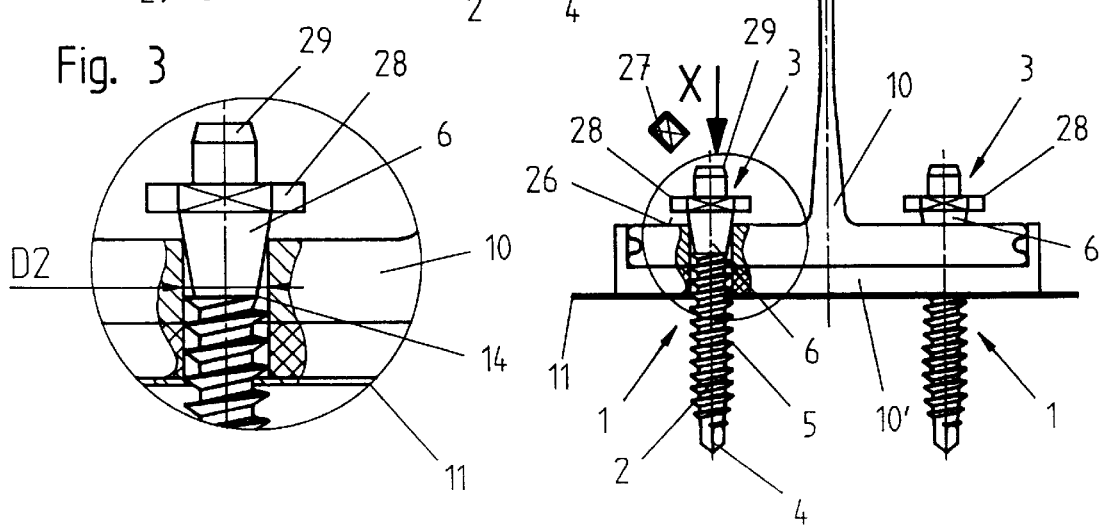

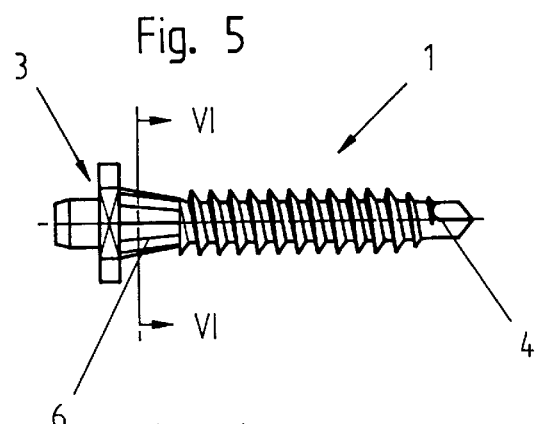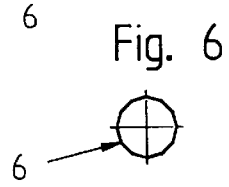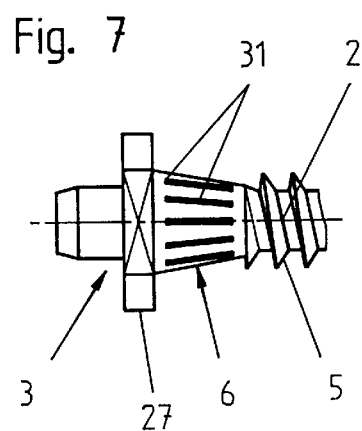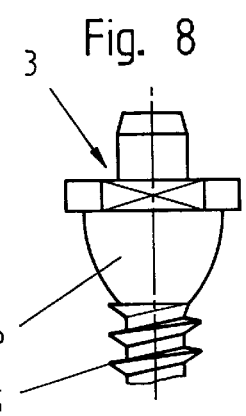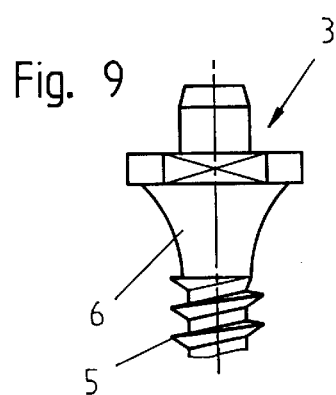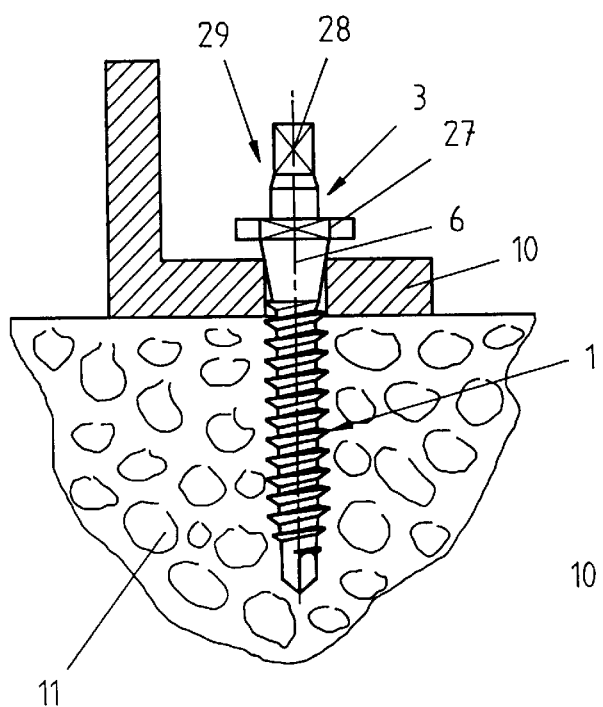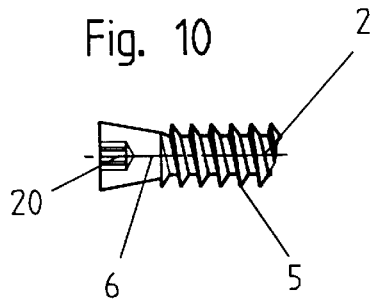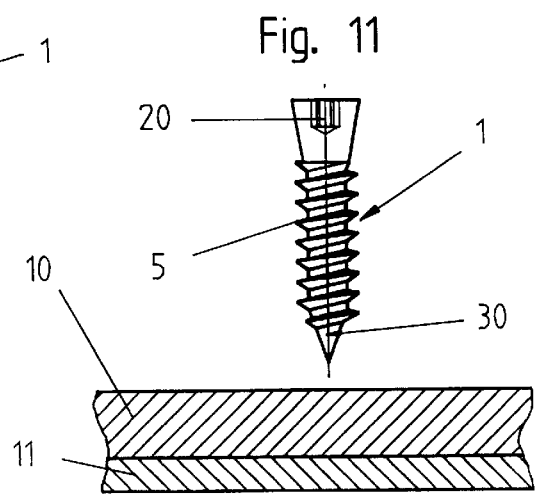

SCREW FOR FASTENING METAL OR PLASTIC SECTIONS OR PLATES ONTO A BASE

The invention relates to a screw for fastening metal and/or plastic sections or plates to a substructure, comprising a shank with a threaded portion and a drive portion for applying a driving tool.

The very act of fastening sections or plates to a substructure is problematic in that such parts must achieve a condition in which they press firmly against the substructure when fastened. These negative effects are intensified when relatively stiff sections or plates become further distorted under certain circumstances or exhibit a longitudinal twist. In this case it is usually not possible to work with a depth limiter for the driving device. Even if torque clutches are used, it is still difficult to stop the process at the precise time, since an associated torque increase occurs as soon as the screw head bears on the section to be fastened, thus stopping the driving device. Further driving movement is then stopped regardless of whether or not the metal and/or plastic section or plate to be fastened continues to bear on the substructure.

The object of the present invention was therefore to provide a screw of the type mentioned in the introduction, in the use of which the section or plate to be fastened bears snugly on the substructure in the finally set condition and torque-dependent stopping of the driving device is possible.

According to the invention, this is achieved by the fact that the portion of the shank adjacent to the drive portion flares toward the drive portion conically, in the manner of a stepped cone or following a curve as viewed in cross section, and that the diameter of the end of the flaring portion of the shank close to the drive portion is larger than the diameter of the borehole receiving the screw in the section to be fastened and thus is also larger than the core diameter of the threaded portion of the screw.

By virtue of these features according to the invention, the metal and/or plastic section to be fastened is subjected to initial tension directed toward the substructure and thus is pressed thereagainst as soon as the screw has been driven in by one or more rotations. Because of the associated friction in the borehole and of the flaring shape, the flaring portion of the shank exerts a force in the screwing direction on the section to be fastened.

It then becomes a simple matter to adjust an appropriate torque clutch such that it disengages only at appropriately high torque. By that time, however, the section to be fastened has already been pressed snugly against the substructure by the action of the flaring portion, and so all that remains is for the driving tool to be stopped as soon as the appropriate torque is reached. The torque is achieved by the high friction of the flaring portion against the wall of the borehole. Thus rapid, torque-dependent stopping is possible, or further driving will be safely prevented.

The action of the flaring portion on the borehole wall also produces extremely good locking against reverse rotation. The surface of the flaring portion is for practical purposes disposed in a snug-fitting seat in the borehole wall. Furthermore, in the particular case of sections that have become distorted or twisted in the process, said sections have a tendency to return to their initial condition. Thereby an additional resilient load is always exerted on the screw, intensifying the locking effect against reverse rotation, especially in view of the action of the conical portion.

It is intuitively obvious that the beginning of the flaring portion must extend from the shank or from an unthreaded portion of the shank, because this flaring portion, while following the shank, must be inserted easily into the borehole in the section to be fastened. Thereafter, however, it is necessary that the flaring portion engage as rapidly and effectively as possible with the borehole wall, so that thereby it can apply the axial initial tension optimally. In this way the tightening torque and therefore the axial initial tension are exerted on the section to be fastened as soon as the screw has been driven in a relatively short distance, before the process of driving the screw is fully accomplished.

Another advantage of the flaring portion is that optimum fastening to a substructure is possible even if said substructure comprises a thin metal sheet, other thin materials or a material of low strength, such as gas-formed concrete or even foamed material. Since the flaring portion for practical purposes represents the agency which initiates an associated torque increase, stripping of the thread in the substructure cannot occur.

In another proposal according to the invention, the flaring portion of the shank extends directly to the drive portion or to the underside of the drive portion formed as the screw head. This ensures that the borehole will be steadily widened until the screw is finally set. Thereby there is also achieved a steadily increasing torque, which can be sensed by a driving tool with an adjustable stopping reaction or else prevents further driving of the screw in some other way.

In this regard it is also important to note that torque-activated stopping must take place with great precision, since the engagement of the thread in the substructure can be damaged under certain circumstances, thus negating the fastening effect, if driving is stopped too late.

It is also advantageous if the diameter of the end of the flaring portion of the shank close to the drive portion is larger than the outside diameter of the threaded portion on the shank. It is immaterial for the optimal effect of the present invention whether there is present in the section or plate to be fastened a prebored borehole or else a threaded bore, in which the screw is driven. An appropriate axially directed initial tension is always produced by the flaring portion in the threaded borehole of the section to be fastened or else in a borehole which is larger than the outside diameter of the thread. If thread turns are present, they will be compressed against or pressed flat by the flaring portion, and thereby the friction between the flaring portion and the borehole wall is smaller at least in the first two rotations than if the borehole wall had been smooth. Under these conditions, therefore, it is ensured that the sections or plates to be fastened will be drawn together appropriately with the substructure before the driving tool is stopped or further driving of the screw is interrupted.

An advantageous embodiment is obtained when the drive portion comprises two regions disposed successively in axial direction with different structures for a tool drive. This therefore also permits tightening with a larger or smaller wrench size as needed and thus with larger or smaller torque transmission.

In this connection, a further advantageous embodiment is achieved when one region of the drive portion is designed for engagement of the driving tool and the other region is designed for application of a tool for reverse rotation of the screw if necessary, wherein a predetermined breaking point acting as a stripping safeguard is formed between the two regions of the drive portion. This creates the possibility that the screw can be driven in with the one region of the drive portion and, after the two parts to be joined to one another have been drawn appropriately together and the torque has been increased appropriately by engagement of the flaring portion of the shank, the torque is increased so much that this first region of the drive portion breaks off. In this way, further driving of the screw is suddenly prevented, and so stripping in the substructure, especially when it has small thickness and/or low strength, is prevented. Nevertheless, if it becomes necessary to loosen the screwed joint, an additional region of the drive portion is still present on which another tool can be applied.

In one advantageous embodiment, the end of the shank facing away from the drive portion is constructed as the boring part. Such an embodiment is advantageous in particular when the two structural members to be joined to one another do not have large thickness or when a corresponding borehole is already present in the structural member to be fastened to the substructure. In this case only the borehole in the substructure has still to be made by the screw itself.

In the very case in which two structural members of small thickness are to be joined together, it is also possible for the end of the shank facing away from the drive portion to be constructed as the penetration point which self-taps the borehole. Such a structural geometry is expedient in particular when, for example, structural members of aluminum or of plastic are to be joined to one another.

If relatively rapid setting of the screw is necessary, it is advantageous for the threaded region of the shank to be of double-threaded construction. By the arrangement of the flaring portion, and specifically in connection with the predetermined breaking point in the region of the drive portion, an optimal embodiment has been created even for the case of relatively rapid axial feed of the screw.

To avoid an excessively high torque already as the thread is being cut in the borehole, it is proposed that the threaded region of the shank be formed with a self-cutting thread. By means of such an embodiment a thread is cut with relatively low torque, and so the danger of premature stopping or premature break of the predetermined breaking point is prevented. In this connection it is particularly expedient for the threaded region of the shank to be constructed in the manner of an orbiform curve, for example with trilobular shape. It has been found that such a design of a thread is advantageous in the very case of insertion in a substructure of small thickness and/or low strength.

The torque specified for stopping the driving tool or for breaking of the predetermined breaking point can be influenced by choice of a special fastening for metal and/or plastic sections or plates to a substructure and by choice of the material of the substructure. Thus it is conceivable that the flaring portion could be trumpet-shaped. It would also be possible, however, for the flaring portion to be bell-shaped.

The simplest geometry in this connection is obtained when the flaring portion has the shape of a truncated cone. In this case the penetration depth of this portion can be predetermined by the choice of cone angle and, moreover, smaller or larger mutual friction areas between the borehole or threaded hole and the surface of the truncated-cone portion are obtained depending on cone angle.

A further advantage of the invention is that the drive portion for a driving device is designed directly as an internal drive in the flaring portion of the shank. It would therefore also be conceivable to provide the drive portion not in the form of an otherwise standard screw head, but to allow the screw to end precisely with this flaring portion.

A further possibility for influencing the friction between the flaring portion and the borehole surface cooperating therewith exists when the flaring portion is provided on its surface with projections and/or depressions, with ribs, grooves, knurlings or the like. Thereby the friction can be substantially increased or changed without reducing the ability of the section or plate to be fastened and the substructure to be drawn together. This additional design of the surface of the flaring portion also provides an additional improvement with respect to locking against reverse rotation, especially at fastening points which are exposed to vibrations or constant load changes.

Further features and special advantages according to the invention will be explained in more detail in the following description with reference to the drawings, wherein:

FIG. 1 shows an elevation of an embodiment of the screw according to the invention;

FIG. 2 shows an example of insertion of such screws in partly cutaway view;

FIG. 3 shows and enlarged view of the detail marked X in FIG. 2;

FIG. 4 shows an oblique view of an application situation for the fastening of sections according to FIG. 2;

FIG. 5 shows a further embodiment of the screw and

FIG. 6 shows a cross section through the line VI—VI in FIG. 5;

FIG. 7 to FIG. 11 show further alternative embodiments of the screw according to the invention;

FIG. 12 to FIG. 16 show two alternative embodiments for a screw that cooperates with dish-like additional parts.

Figure 13:
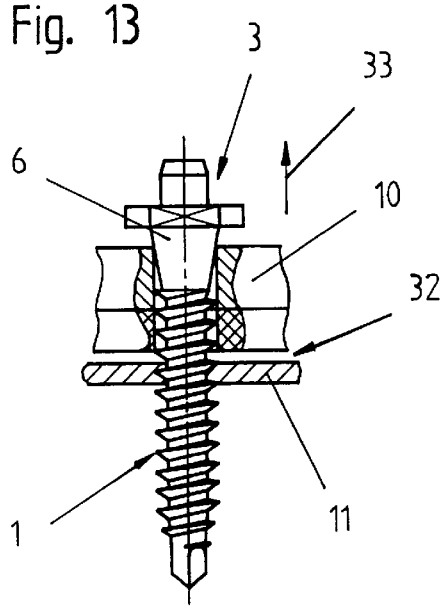

The screw 1 according to the invention comprises a shank 2 and a drive portion 3 formed, for example, as a screw head. Shank 2 is provided at one of its ends with a boring portion 4 and is also provided with a threaded portion 5. Portion 6 of shank 2 adjacent to drive portion 3 is flared conically toward screw head 3.

Hereinafter portion 6 will be referred to exclusively as conically flaring, although the geometry of this portion 6 can certainly be diverse. In addition to the conical geometry illustrated here, it would also be possible to provide a structure comprising a stepped cone or a flared structure whose cross section follows a curve. Such embodiments will be discussed in further detail with references to figures in the drawing.

Conical portion 6 of shank 2 extends directly to underside 7 of drive portion 3. The diameter DK of the end of conical portion 6 close to the screw head is larger than the diameter D2 of the borehole 14 which receives screw 1 in the section 10 to be fastened. Accordingly, diameter DK is naturally also larger than the boring diameter DB of boring portion 4. To achieve an appropriate optimum effect, diameter DK of the end of conical portion 6 close to the screw head is larger than the outside diameter DG of threaded portion 5 on shank 2. Screw 1 is used to fasten sections 10 and if necessary intermediate layers 10' to a substructure 11, as can be seen in FIG. 3, for example.

The illustrated special fastening situation will be explained in further detail by referring also to FIG. 4. Steel sheets 22 with trapezoidal corrugations are laid on a beam 21 and firmly joined thereto. After placement of a moisture barrier 23, sections 10 are fastened at suitable spacings to steel sheet 22 with trapezoidal corrugations, if necessary with inclusion of intermediate layers 10'. These steel sheets with trapezoidal corrugations have small thickness, and so precisely in such a fastening situation it is very important not only that section 10 be firmly pressed against and held firmly on the substructure, but also that the screw not be stripped while being set, so that the thread can remain firmly anchored in the very thin structure of steel sheet 22 with trapezoidal corrugations. After sections 10 have been mounted, thermal insulation 24 is placed and finally the standing-seam roof of metal or plastic is placed thereon. Joining of standing-seam plates 25 with the substructure formed by steel sheet 22 with trapezoidal corrugations is achieved via sections 10, and so these are exposed to a particular load precisely in the case of suction forces developed by wind action.

In such a type of fastening, an important feature is that exact setting depth of screw 1 is not required, as can be inferred from FIG. 2 and 3. Therein further driving of screw 1 is interrupted before underside 7 of drive portion 3 bears on upper side 26 of section 10. Such a construction is advantageous precisely in this application, because thermal insulation 24 is laid directly thereon, and so no problems of any kind arise with regard to the part of screw 1 protruding beyond upper side 26 of section 10. In the embodiment of screw 1 according to FIG. 1, 2 and 3, flaring portion 6 of shank 2 extends directly to drive portion 3 and thus to underside 7 of drive portion 3 designed as the screw head. In another conceivable embodiment, conical portion 6 does not extend directly to underside 7 of drive portion 3 designed as the screw head, but instead a short cylindrical portion, for example, which merges into underside 7 of drive portion 3 designed as the screw head, adjoins this conical portion 6.

A particular embodiment of drive portion 3 can also be seen from the figures of the drawing. Drive portion 3 comprises two regions 27 and 28 disposed successively in axial direction and provided with different structures for a tool drive. Therein region 27 of drive portion 3 is designed for engagement of the driving device. The other region 28, which in the illustrated practical example has a larger outside perimeter than region 27, serves for application of a tool for reverse rotation of screw 1 if necessary, if the joint had to be loosened once again. A predetermined breaking point 29 is provided between the two regions 27 and 28. At least an appropriate notch effect is present here at the transition from a thinner to a thicker material, in order thereby to achieve protection against stripping. Once conical portion 6 starts to bear against the wall of borehole 14, and once an appropriately high torque is generated because the structural members to be joined are pressing against one another and thus conical portion 6 is exerting pressure, region 27 of drive portion 3 breaks off, and so further driving of screw 1 is suddenly prevented. Thus stripping of the thread cannot occur in substructure 11, which usually comprises material of small thickness or low strength.

The structural geometry of the two regions 27 and 28 and of predetermined breaking point 29 disposed therebetween naturally can be achieved in various ways. It would be entirely conceivable for region 28 of the drive portion to be used for driving the screw and to be separated from adjacent portion 6 by a predetermined breaking point. In such a case, it would also be conceivable to provide, instead of protruding region 27, a corresponding region as an internal drive, which projects into conical portion 6. Thus an external drive would be used for driving and an internal drive for reverse rotation. In addition, it would be conceivable in this situation for the uppermost region of conical portion 6 to be provided with an appropriate wrench drive, or in other words to have a region 28, which nevertheless does not project beyond the circumference of conical portion 6. In this connection, therefore, a plurality of structural alternatives is possible.

In several alternative embodiments according to the drawings, the end of shank 2 facing away from drive portion 3 is constructed as boring part 4. Such a geometry is suitable in particular when relatively thin parts are to be joined together or when the part to be fastened is already prebored. A relatively short boring part will then suffice, since the boring process must be ended before the threaded region engages.

In the very case of the embodiment according to FIG. 11, it is clear that screw 1 can also be constructed with a penetration tip 30 which itself taps the borehole. This embodiment is chosen when both section 10 and substructure 11 have relatively small thickness and advantageously comprise aluminum or plastic.

Threaded region 5 of shank 2 can have one or more threads. In the case of multiple threads, it is advantageous to provide a double-threaded construction, which is particularly appropriate when relatively rapid setting is desired.

Advantageously the threaded region of the shank is constructed with a self-cutting thread. Thereby the torque is not already too high during cutting of the thread, and so breaking of the predetermined breaking point or torque-dependent stopping of the driving device in response to a large torque increase does not take place until conical section 6 has just been inserted. Specifically as regards the design of the thread, it is advantageous to provide a threaded region 5 in the form of an orbiform curve, for example with trilobular shape.

As already explained, flaring portion 6 can be constructed in diverse ways. According to the embodiment of FIG. 8, flaring portion 6 has bell-shaped construction, in which the angle of insertion of portion 6 is relatively shallow at the beginning and then becomes progressively steeper. In contrast thereto, flaring portion 6 in the embodiment of FIG. 9 is trumpet-shaped, and so the angle of insertion of portion 6 increases steadily relative to the central axis of screw 1. In this way further adaptation of the torque to be applied can be additionally achieved.

The simplest embodiment of flaring portion 6 is achieved when it has the shape of a truncated cone, as can be inferred from most of the illustrated practical examples.

In the embodiments according to FIG. 10, 11, 14 and 15, no further special region of the drive portion adjoins conical portion 6. Therein only a drive portion in the form of an internal drive 20 is provided.

FIG. 5 and 6 show an embodiment in which flaring portion 6 has the structure of a truncated polygonal pyramid, whereby projections and/or depressions are obtained which act to increase the friction as portion 6 is being driven into the corresponding borehole.

The embodiment according to FIG. 7 is provided with ribs 31 or grooves, which contribute to increasing the friction and also to improving safety against reverse rotation.

In the scope of the invention, it is also possible to provide, in other ways, projections and/or depressions, ribs, grooves or, for example, knurlings or the like. Furthermore, different cross-sectional forms in the region of portion 6 are possible. Thus the portion could also be non-round in cross section, for example elliptical, or could have the form of an orbiform curve, for example with trilobular shape.

It can be seen from FIG. 12 that the screw according to the invention is also particularly suitable for use in material of low strength. For example, fastenings in cellular concrete or even in foamed materials are entirely possible in this way, without the risk of stripping of the threaded region in substructure 11 despite adequate fastening.

From the embodiment according to FIG. 13 it can be inferred that a gap 32 between section 10 and substructure 11 may develop under very high stress or sufficient twisting of section 10. Even at such an inherently undesirable fastening point, however, it is always ensured that screw retention is nevertheless present. In the case of such loading on section 10 in the direction of arrow 33, for example in the case of such suction load due to wind action, section 10 is pulled correspondingly upward and thus becomes wedged even more relative to portion 6. Thereby a further improvement of locking against reverse rotation is created.

Figure 14:
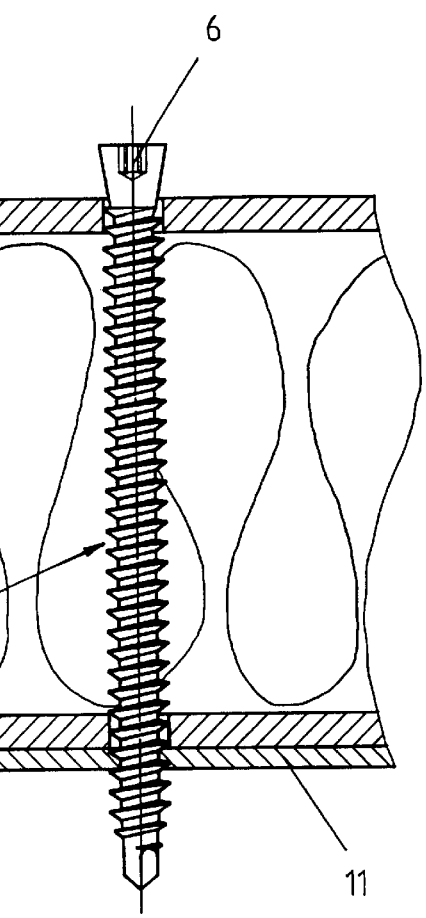

In the embodiment according to FIG. 14, a section 10 or a corresponding plate in the form of insulation enclosed on both sides with a sheet-metal liner is fastened to a substructure 11. Threaded region 5 of screw 1 engages in substructure 11, and so flaring portion 6 engages in the borehole on the outside of section 10, exerting pressure and increasing friction in the process. Thus such fastening can be achieved even without the need for a screw head or the underside of a screw head to rest snugly against the surface of a section 10.

Figure 15:
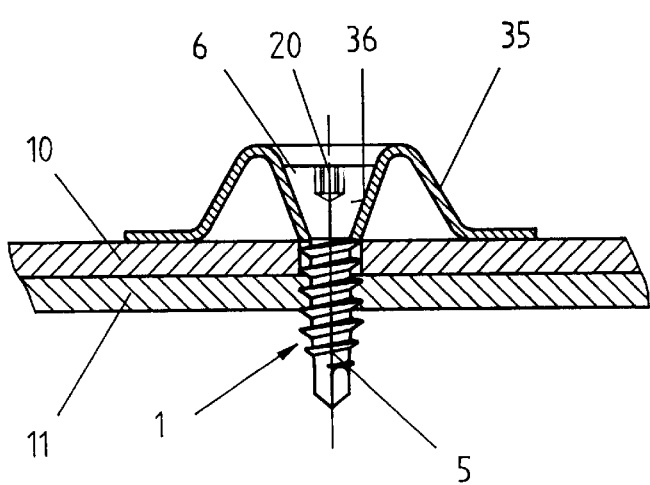
Figure 16:
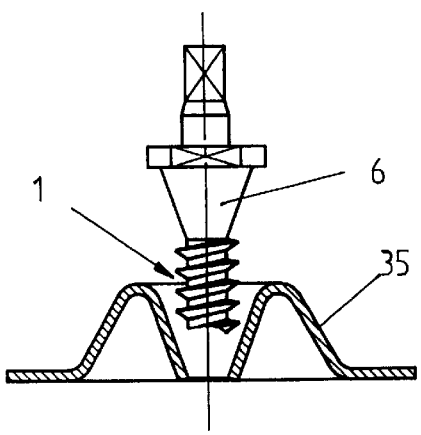

Another alternative embodiment is illustrated in FIG. 15 and 16. In such an embodiment, a section 10 and a substructure 11, for example, are joined to one another, and there is placed on section 10 a kind of profiled washer 35, which is held securely against rotation during the process of driving the screw. By the action of driving threaded portion 5, section 10 and substructure 11 are forced toward one another as soon as portion 6 comes into contact with funnel-shaped inside face 36 of washer 35. In this case also the parts are drawn correspondingly together and, in addition, corresponding friction is developed by flaring portion 6, in order thereby to disengage the torque clutch from the driving device or to cause a region of drive portion 3 to break off. In the embodiment according to FIG. 15, only an internal drive 20 is present, whereas in the embodiment according to 16 a drive portion 3 similar to that of the embodiment according to FIG. 1 is formed.

Drive portion 3 could be provided additionally on its underside 7 with projections and/or depressions for very special purposes. Ribs, slots, rippled ribs, roughened areas, individual points, serrated ribs or the like could be formed here. Such a geometry would be appropriate if the section to be fastened or the plate to be fastened also consists of a material of low strength, so that the flaring portion is sometimes not fully drawn into the section to be fastened or the plate to be fastened. Under these conditions the driving device would not be stopped practically until the last possible instant, when the torque load would suddenly become extremely high. In this case also, a torque clutch having a mechanical, electronic or hydraulic control device will suffice.

By virtue of the features of the invention there is always developed an appropriate tightening torque, viewed in the axial direction of the screw, and so the sections to be fastened or a plate to be fastened are or is always pressed securely and snugly against solid substructure 11. Moreover, precisely because of the mutual bracing resulting from the bearing action of flaring portion 6 there is achieved a large torque increase, which at the proper time leads to torque-dependent stopping of the driving tool or breaking of the fastener in the region of a predetermined breaking point. Even if no axial forces are developed by the mutual drawing together of the structural members to be fastened, an adequately large torque increase can be achieved by appropriate pressure on the fastener, by acting, for example, on the driving device. Because of the large torque increase when the flaring portion engages, it is assured with certainty that stopping of the driving device will take place before any damage can be caused to the thread in the substructure, and so a screw according to the invention can be inserted in advantageous manner not only in thin sheets, but also in a substructure of thin material or of material of low strength. Moreover, appropriate locking against reverse rotation is always assured.

What is claimed is:

1. A screw for fastening metal and/or plastic sections or plates to a substructure through a borehole (14) having a diameter (D2), said screw comprising;
   a shank with a threaded portion having a core diameter (D1) and an outside diameter (DG), a drive portion for applying a driving device, and a flaring portion (6) adjacent to the drive portion (3) that flares conically toward the drive portion (3),
   said flaring portion (6) having a diameter (DK) close to the drive portion that is larger than the diameter (D2) of the borehole (14) receiving the screw (1) and is also larger than the core diameter (D1) of the threaded portion (5) of the screw (1), and
   said drive portion (3) further comprising a region (27) having a stripping safeguard (29) adapted to prevent stripping of the threaded portion of the screw within the substructure.

2. A screw according to claim 1, wherein the flaring portion (6) of the shank (2) extends directly to the drive portion (3) or to the underside (7) of the drive portion (3) formed as the screw head.

3. A screw according to claim 1, wherein the diameter (DK) of the end of the flaring portion (6) of the shank (2) close to the drive portion is larger than the outside diameter (DG) of the threaded portion (5) on the shank (2).

4. A screw according to claim 1, wherein the drive portion (3) further comprises a region, (28) disposed successively in the axial direction with region (27), said regions (27, 28) being adapted for engagement with different structures of a tool drive.

5. A screw according to claim 4, wherein region (27) of the drive portion (3) is adapted for engagement with a driving tool and region (28) is adapted for engagement with a tool for reverse rotation of the screw (1).

6. A screw according to claim 1, wherein the end of the shank (2) facing away from the drive portion (3) is constructed as a boring part (4).

7. A screw according to claim 1, wherein the end of the shank (2) facing away from the drive portion (3) is constructed as a penetration point (30) which self-taps the borehole.

8. A screw according to claim 1, wherein the threaded region (5) of the shank (2) is of double-threaded construction.

9. A screw according to claim 1, wherein the threaded region (5) of the shank (2) is formed with a self-cutting thread.

10. A screw according to claim 8, wherein the threaded region (5) of the shank is constructed in the manner of an orbiform curve, for example with trilobular shape.

11. A screw according to claim 1, wherein the flaring portion (6) is trumpet-shaped.

12. A screw according to claim 1, wherein the flaring portion (6) is bell-shaped.

13. A screw according to claim 1, wherein the flaring portion (6) has the shape of a truncated cone.

14. A screw according to claim 1, wherein the drive portion (3) for a driving device is designed directly as an internal drive in the flaring portion (6) of the shank (2).

15. A screw according to claim 1, wherein the flaring portion (6) is provided on its surface with projections and/or depressions, with ribs (31), grooves, knurlings or the like.

16. A screw according to claim 5, wherein the stripping safeguard (29) is formed between the regions (27, 28) of the drive portion (3).

* * * * *